United States Patent
Lai

(10) Patent No.: US 7,577,833 B2
(45) Date of Patent: Aug. 18, 2009

(54) APPARATUS AND METHOD FOR HIGH SPEED IPSEC PROCESSING

(75) Inventor: Yi-Sern Lai, Tainan (TW)

(73) Assignee: Industrial Technology Research Institute, Hsinchu Hsien (TW)

( * ) Notice: Subject to any disclaimer, the term of this patent is extended or adjusted under 35 U.S.C. 154(b) by 425 days.

(21) Appl. No.: 11/429,540

(22) Filed: May 5, 2006

(65) Prior Publication Data

US 2006/0265585 A1    Nov. 23, 2006

Related U.S. Application Data

(62) Division of application No. 10/225,027, filed on Aug. 21, 2002, now abandoned.

(51) Int. Cl.
*H04L 9/00* (2006.01)

(52) U.S. Cl. .................... 713/151; 713/189; 709/223; 709/227

(58) Field of Classification Search .................. 713/151
See application file for complete search history.

(56) References Cited

U.S. PATENT DOCUMENTS

| 6,157,955 | A | 12/2000 | Narad et al. |
|---|---|---|---|
| 6,708,218 | B1 | 3/2004 | Ellington et al. |
| 6,941,366 | B2 | 9/2005 | Antes et al. |
| 7,194,766 | B2 * | 3/2007 | Noehring et al. ............ 726/13 |
| 2001/0042204 | A1 | 11/2001 | Blaker et al. |
| 2002/0087708 | A1 | 7/2002 | Low et al. |
| 2002/0188839 | A1 * | 12/2002 | Noehring et al. ........... 713/153 |
| 2003/0196081 | A1 | 10/2003 | Savarda et al. |
| 2003/0200456 | A1 * | 10/2003 | Cyr et al. .................. 713/200 |
| 2004/0008711 | A1 | 1/2004 | Lahti et al. |

* cited by examiner

*Primary Examiner*—Nasser G Moazzami
*Assistant Examiner*—Fikremariam Yalew
(74) *Attorney, Agent, or Firm*—Thomas, Kayden, Horstemeyer & Risley

(57) ABSTRACT

An IPSec processor is a network security device. It is designed primary for an environment requesting for a throughput of Gigabits per second. By using a new architecture, the parallel processing and pipeline processing become more efficient, thereof higher performance. An IPSec Core in the IPSec processor employs the sharing structure, which raise the utility of the Encryption Engine and Authentication Engine. Moreover, the IPSec Core can be duplicated, allowing a parallel processing. Because the IPSec Core deals with IPSec processing, the Pre_Operation, operation, and post_operation, it becomes a complete set of processing unit and easy for duplicating. In addition, several features have been created for a hardware base implementation, including the processing of the bundled SA case, early verification of the packet, and no need to build an additional context in order to perform a crypto operation.

12 Claims, 6 Drawing Sheets

APPARATUS AND METHOD FOR HIGH SPEED IPSEC PROCESSING

CROSS-REFERENCE TO RELATED APPLICATION

This application is a divisional of U.S. patent application Ser. No. 10/225,027, filed Aug. 21, 2002 now abandoned.

BACKGROUND OF THE INVENTION

1. Field of Invention

The invention relates to an IPSec Processor and, in particular, to a mechanism for a high speed IPSec processing.

2. Related Art

IP Security (IPSec) apparatuses are used to secure the information propagated in a public network. Several applications, including Virtual Private Network (VPN) and cable modem, have adopted IPSec as a standard for their own security purpose. IPSec apparatus may have their processing throughput covering quite a wide range from an order of hundred kilobits-per-second to several Gigabits-per-second. There are several solutions for the IPSec apparatuses. One may use a full-software solution. The software solution works fine except the performance was only about 1M bits per second or even lower, which is really too slow. This is almost not acceptable especially in the network blooming era. The development of WDM and Gigabit Ethernet stimulate the network bandwidth from Megabits to Gigabits per second.

FIG. 1 shows a block diagram of a conventional IPSec system structure. The IPSec system consists of a CPU 100, a Memory 110, and an Accelerator 120. Here, the IPSec Accelerator 120 is employed only to reduce the CPU 100 computation load in 3DES and HMAC operations. The CPU 100 has to take care of all other functions, including the parsing, packet classification, database maintenance, pre-operation (e.g. packet forming and trailer making), post operation, packet IO, and the IP layer processing (e.g. fragmentation re-assembly). In addition, it has to form a context for the IPSec accelerator. The throughput is very limit due to a big overhead described above. The transfer speed is also limited by the rise time of the Memory 110 and thereof a long CPU read/write cycle. It is the easiest way to implement, whereas the system performance is quite low even employing a high-speed accelerator.

FIG. 2 shows a conventional IPSec processor with an embedded CPU and Memory, which is an extension of the IPSec system shown in FIG. 1. An IPSec processor is constructed of an embedded CPU 200, an embedded Memory 210, and an accelerator (or Crypto Engine 220). It does increase the transfer speed due to a higher data transfer rate. Yet, it has to deal with the big overhead as described above. Hence, it is still difficult to achieve a very high throughput of like Gigabits per second.

FIG. 3 shows the traditional pipeline concept. Packets are delivered through n stations, which deal with packet input, making trailer, header making/modifying, operation, post operation, and packet output respectively. The pipeline expedites the processing speed by making all the stations busy; a station works on the outputs of its previous station as soon as it is available. However, there are two problems:

1) A packet has to check in and check out of anyone of the stations. Hence, one is in want of additional buffers to get things done. It also takes time to check in and check out.

2) It takes extra time to feedback the data to the beginning state for an SA (security association) bundled case; one has to process the very packet again and needs feedback the data for the bundled SA processing.

In the prior arts, several copies of accelerators (or Crypto Engine 220) could be duplicated such that the Crypto Engine 220 gains a high performance capability. Namely, the parallel technique is involved in that design. That is what current commercial products do in order to increase the IPSec processing performance. Some advanced commercial products add a few features like checksum and mutable bits processing, in their devices. There are however several drawbacks for this kind of the parallel processing:

1) It's very time consuming or even difficult to deal with a bundled SA case, since the whole packet has to be fed back for the bundled SA; it has to repeat the processes from parsing, classification . . . to output.

2) Crypto Engine 220 utility is not high. Accordingly, the Crypto Engine 220 has to deal with encryption, authentication, and encryption plus authentication. The encryption engine and authentication engine are chained together to provide all the three service styles. Hence, the whole Crypto Engine 220 can service one packet with one of three service styles; it can not service two packet at a time. A "collision" problem also causes a reduction of the utility of Crypto Engines 220. When two Crypto Engines 220 finish their job at about the same time, one of the Crypto Engines 220 has to output after the other. No input is allowed before the complete of output, therefore no input is allowed for both of the two engines and one of them has to idle even longer.

3) The control is complicated. Firstly, one needs to build up a context for the Crypto Engine 220 (or accelerator). Secondly, the post processing causes an extra effort.

4) It is not efficient to verify the authenticity of incoming packets one can do verification only after the crypto operation is completed. Since the crypto operation is the bottleneck of the whole process. It may take long time to perform a decryption operation while the packet is turned out to be a fake one.

5) The bottleneck may switch to the pre-operation, which includes packet forming and context making. Seeing that crypto engines could be duplicated as many as you want while the pre-operation is alone.

SUMMARY OF THE INVENTION

Depending on the throughput requirement for a specific application, IP security devices are employed to enhance the performance. This disclosure is particularly directed to a device and method, which causes high performance in IPSec processing.

This invention provides an IPSec processor that processes IP packets according to the IP security protocols at a high throughput.

To realize the above objective, the preferred embodiment of the present invention provide an External IN Buffer, an External OUT Buffer, a Parser, a Classification unit, a Database, a Database Manager, and one or more IPSec Cores.

The IPSec processor is composed of an inbound IPSec processor and an outbound IPSec processor. The outbound IPSec processor processes packets going from the LAN to WAN and the inbound IPSec processor processes packets traveling from WAN to LAN. The inbound and outbound processors are independent of each other and the processing mechanisms for these two are different. However, the block diagram is the same. The External IN Buffer is used for storing the input packet data. The External OUT Buffer is for storing the processed packet data to be outputted. The Parser parses parameters from the IP header, AH header, ESP header, or transport layer header for classification. The Classification unit looks up a security policy (SP) for outbound service and security association (SA) for inbound service. The Database contains the security associations and security policies. The Database manager maintains the database. Finally, the IPSec Core is used for executing IPSec processing, the Pre_Operation, crypto operation, and Post_Operation.

The IPSec Core further comprises two BUSes (BUS_A and BUS_B), two buffers (Buffer A and Buffer B), two multiplexes (MUX A and MUX B) in two modules (Module A and Module B) separately, and an Encryption Engine, an Authentication Engine, an Output FIFO, a Device unit, and a Control Unit. The two buffers are used for storing packet data and SA data, one for each module respectively. Two Multiplexers allow one of data sources to enter their associated buffers. The Encryption Engine performs encryption operation for outbound service and decryption for inbound service. The Authentication Engine performs digest calculation. The output FIFO balances the output between the internal and the external. The Device unit provides miscellaneous calculations. Finally the Control Unit controls the whole IPSec Core. The Control Unit further comprises two sequence controllers (Control_A and Control_B), an Input controller, a Pre_Operation controller, an operation controller (including a Encryption controller and an Authentication controller), a Post_Operation controller, and an Output controller. The two sequence controllers provide processing sequence one for each module. The Input controller controls the packet data and SA information inputted to its associated buffer. The Pre_Operation controller prepares data for crypto operation. The Encryption controller controls data transfer between Encryption Engine and buffer. The Authentication controller controls the data transfer between the Authentication Engine and buffer. The Post_Operation controller deals with those affairs after crypto operation. Finally, the Output controller controls packet outputting from buffer to the output FIFO.

The second objective of this invention is to provide a method to enhance the performance by using a new architecture, which allows a more efficient pipeline proceeding and parallel processing. The IPSec Core can be duplicated so that inputted packets can be processed in parallel. It deals with total IPSec processing, namely, Pre_Operation, operation, and Post_Operation. Because the interface is very simple, it is feasible for duplication. Another aspect of this invention is the IPSec architecture. Accordingly, the IPSec Core uses a sharing structure, with which the two modules share resource with each other. Each module comprises a buffer, a sequence controller, a MUX, and a BUS. The two modules can deal with two different packets at a time, one for a packet and the other for another packet. The two modules cannot both perform any one of input, Pre_Operation, Post_Operation, encryption, authentication, and output at the same time, however, it allows that one module performs encryption and the other authentication at the same time. The IPSec Core supports three types of operation, the encryption, authentication, and both encryption and authentication operations. The sequence controller chains the encryption and the authentication operations together by controlling data transfer from buffer to the Encryption engine and to the Authentication engine; data transferred to the Authentication engine steals the bus transfer cycle of from buffer to the Encryption engine. Therefore, encryption and authentication can be operated simultaneously for a packet in any one of the two modules.

The final objective of this invention is to provide new features for hardware base implementation. The IPSec Core allows the processing of the bundled SA case. The sequence controller continues the processes for the bundled SA without moving the processed results regarding the previous SA. Because the IPSec Core allows an early verification of the inbound packet, it does not need to perform the verification after the finish of decryption operation. Finally, the IPSec Core does not need an additional context to have crypto operation done.

BRIEF DESCRIPTION OF THE DRAWINGS

The present invention will become more fully understood from the detailed description given hereinbelow illustration only, and thus are not limitative of the present invention, and wherein.

DETAILED DESCRIPTION OF THE INVENTION

The present invention will be apparent from the following detailed description, which proceeds with reference to the accompanying drawings, wherein the same references relate to the same elements.

The following discussion assumes that the reader is familiar with IPSec protocols. For a basic introduction of the IPSec, the reader is directed to a text written by William Stallings and entitled "Cryptography and network security," published by Prentice Hall.

To increase the IPSec performance, one has to switch as many functions as possible from software implementation to hardware implementation. An all-hardware solution, which does even not include a CPU in it, will give the best performance. A new architecture with pipeline and parallel processing techniques is essential to enhance the performance. In addition to the performance, one has also to consider the cost and the ease of integration. Where, and how to use those two techniques make it a big difference.

Figure 1:
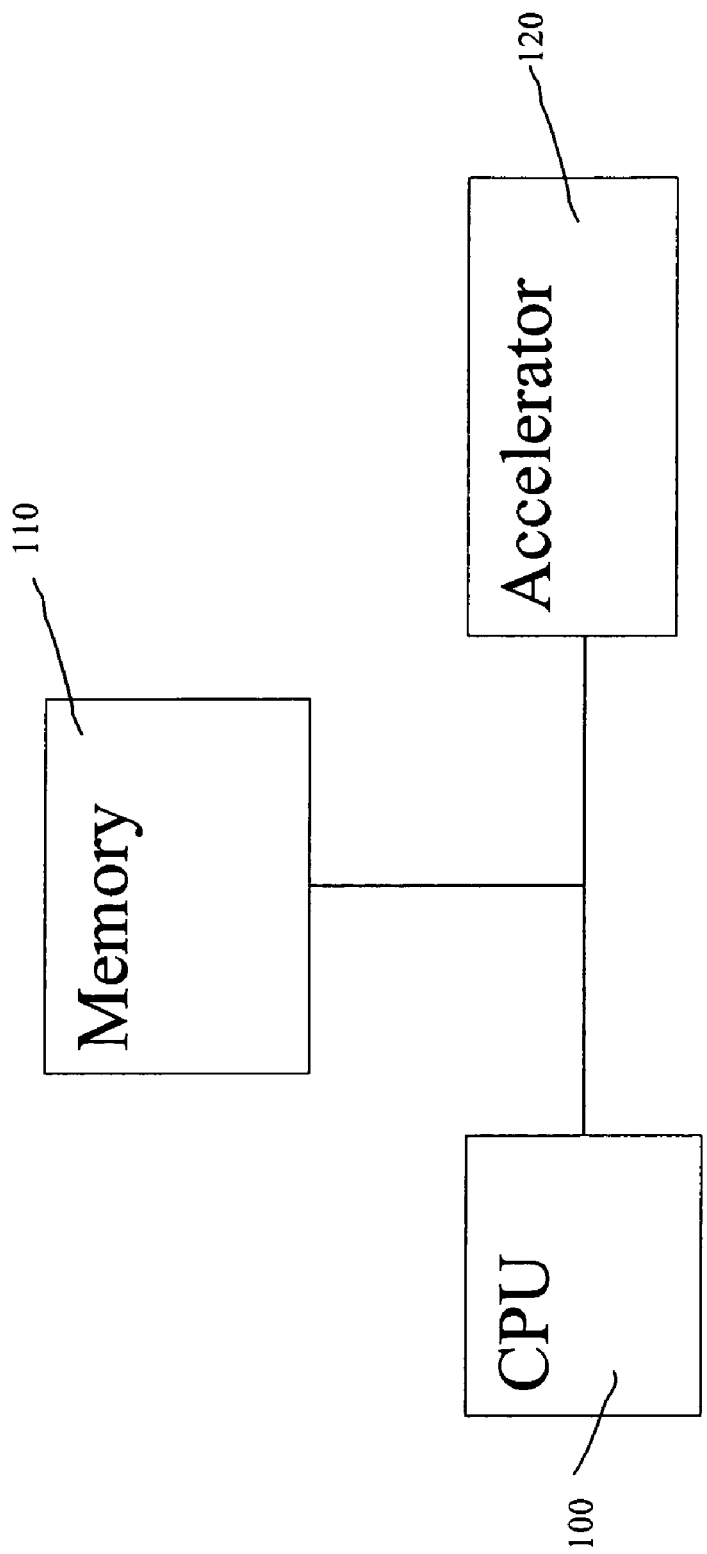
FIG. 1 is a block diagram of a conventional IPSec system structure.
Figure 2:
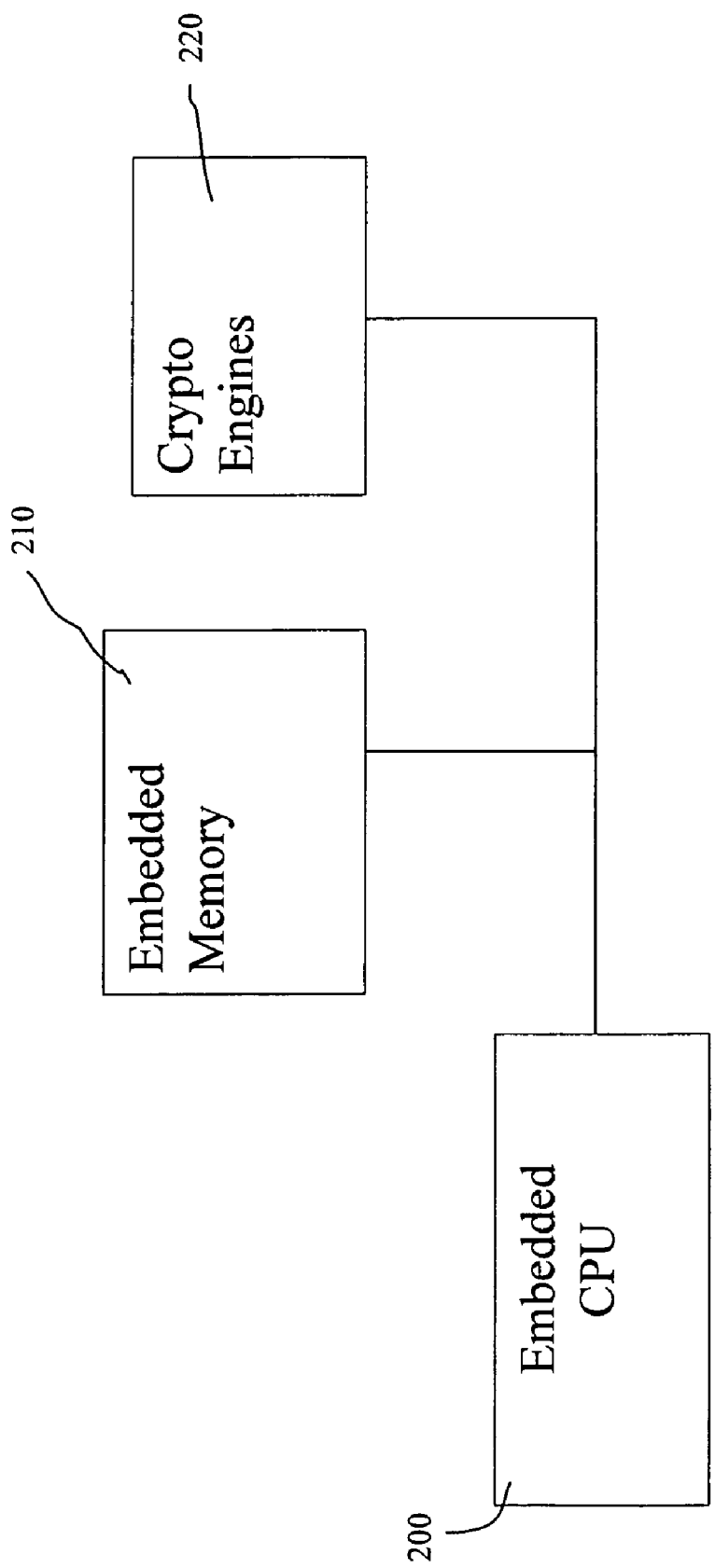
FIG. 2 is an conventional IPSec processor with an embedded CPU.
Figure 3:
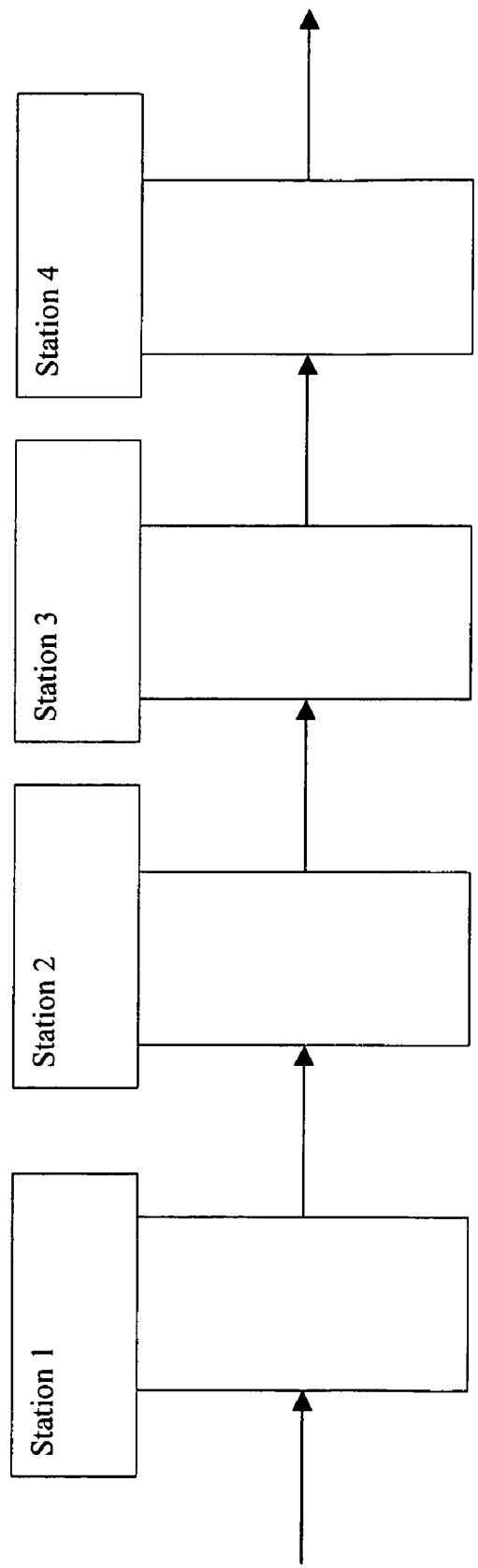
FIG. 3 is a traditional pipeline concept.
Figure 4:
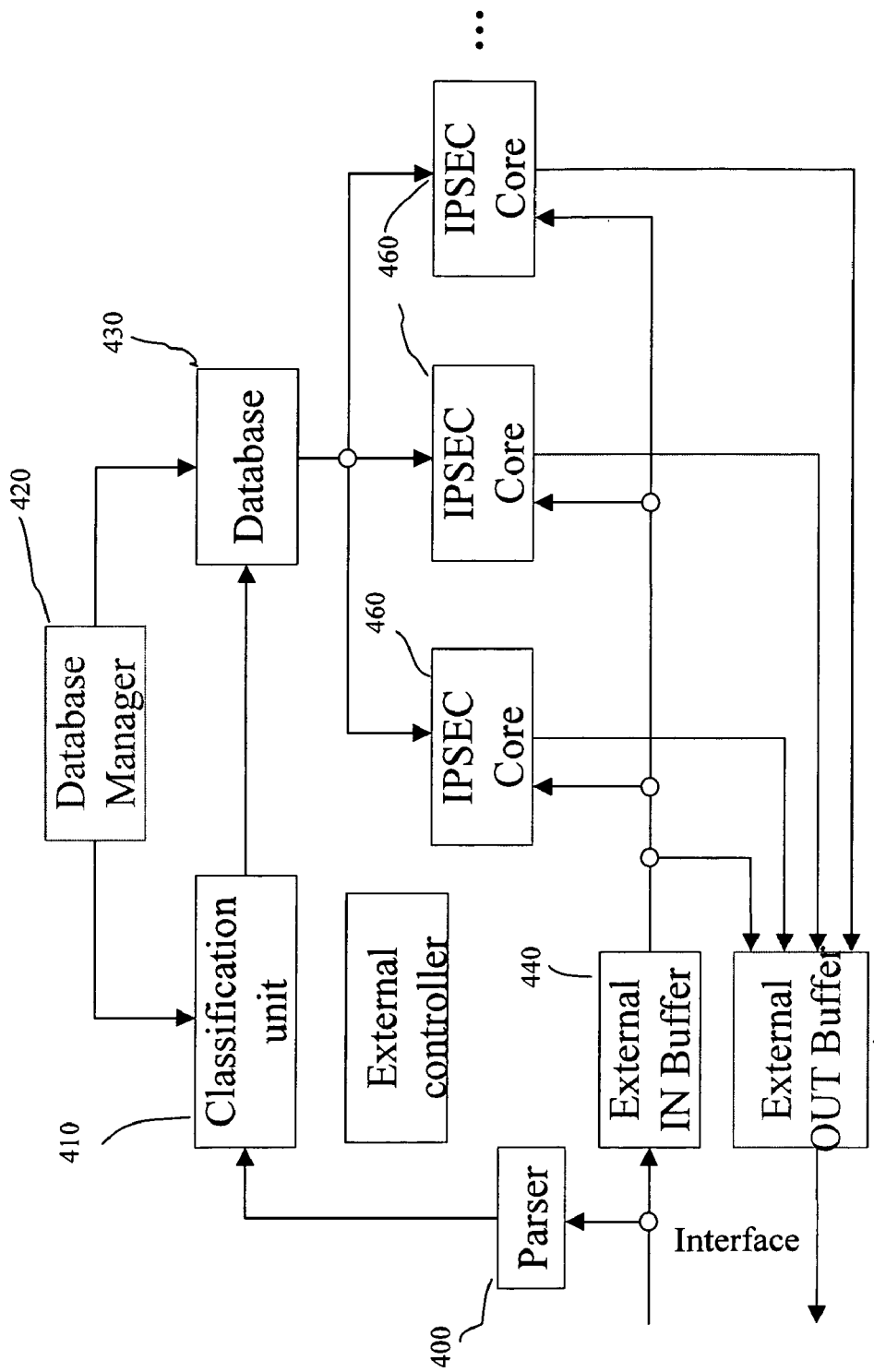
FIG. 4 is a block diagram of an inbound or outbound IPSec processor according to one preferred embodiment of the present invention.

The IPSec processor consists of an inbound IPSec processor and an outbound IPSec processor. FIG. 4 shows the block diagram of the inbound or outbound IPSec processor. The inbound or outbound IPSec processor consists of a Parser 400, a Classification unit 410, a Database Manager 420, a Database 430, an External IN Buffer 440, an External OUT Buffer 450, and several IPSec Cores 460. Note that Database 430 includes SAD (security associate database) and SPD (security policy database). The Parser 400 parses parameters from the input packet data, and forwards those parameters to the Classification unit 410. The Classification unit 410 looks up a policy with those parameters, deciding to discard, bypass, or apply the IPSec processing. The associated packet, stored in the External IN Buffer 440, is neglected for the "discard" case. That packet is bypassed to the External OUT buffer 450 for the "bypass" case. Finally, that packet and its associated SA are forwarded from the External IN Buffer 440 and database respective to one of IPSec Cores 460 for the "applied" case. Packets stored in the External IN Buffer 440, whose output is paged to several IPSec Cores 460. The External OUT Buffer 450 receives outputs of individual IPSec Cores 460 for external access.

In addition, a Database Manager 420 is used to maintain the security policy database (SPD) and the security association database (SAD).

A packet is processed in the sequence of: parsing, classification, transferring packet/SA data to an IPSec Core 460. The IPSec Core 460 takes care of packet input, pre_operation, IPSec operation, post_operation, packet output, and data buffering. Packets are distributed to IPSec cores 460 as soon as they are available so that those packets can be processed in parallel. A packet will be processed according to its given SA(s). The processed packets are delivered to the External OUT Buffer 450. The delivery follows the "First come first serve" principle. For a bundle-SA case, a processed packet can outputted only after the process, regarding all the bundled SAs is done.

The IPSec Core 460 has a simple IO interface; it contains two input ports for packet input and the other for SA input and one output port for processed packet output. The inputs and output are regular synchronous IO design. It is very easy to duplicate the IPSec Cores 460 and therefore able to enhance the performance, due to a simple IO interface and easy access timings.

Figure 5:
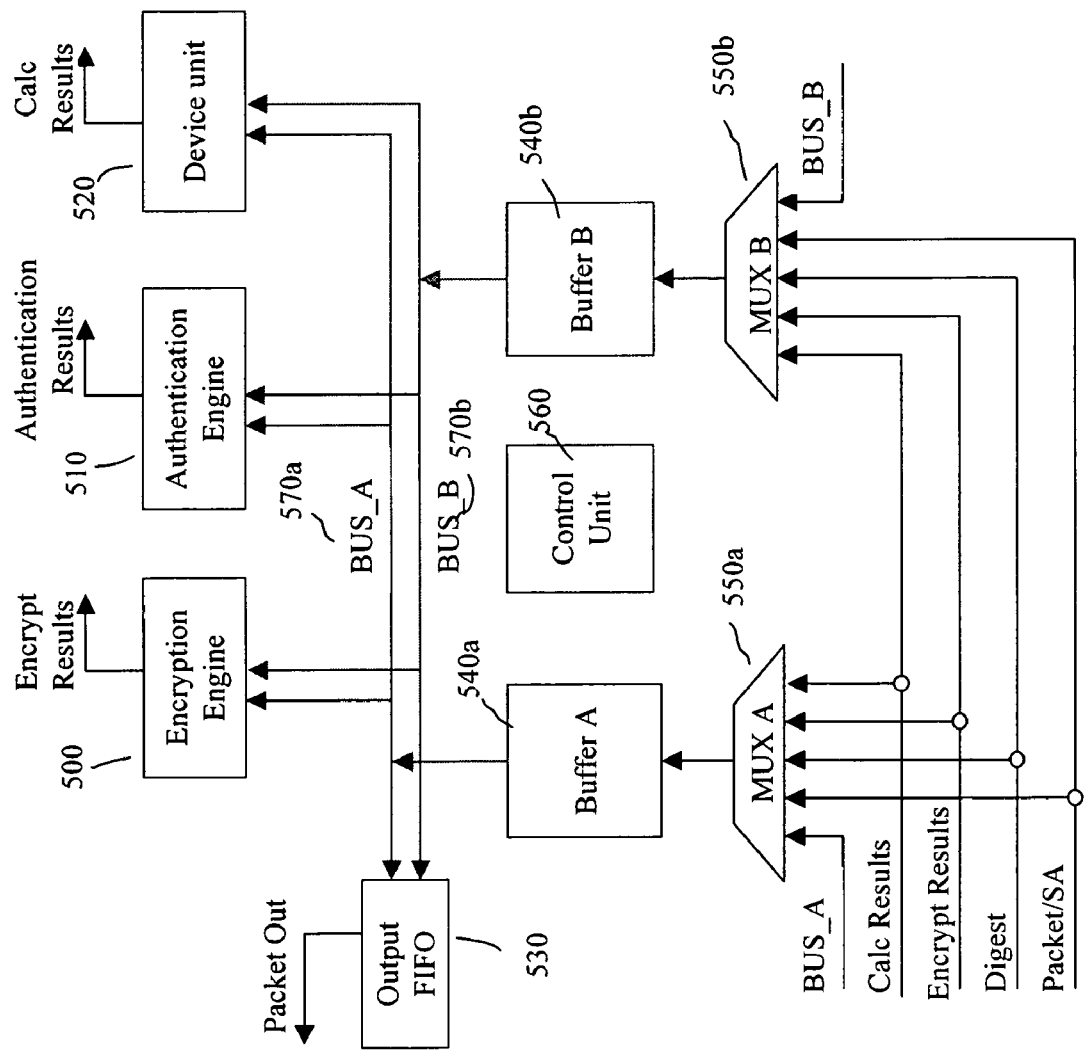
FIG. 5 is a block diagram of the IPSec Core of the preferred embodiment of the present invention in FIG. 4.

FIG. 5 shows the block diagram of the IPSec Core 460 in FIG. 4. The IPSec Core 460 is composed of an Encryption Engine 500, an Authentication Engine 510, a Device unit 520, an Output FIFO 530, two buffers—Buffer A 540*a* and Buffer B 540*b*, two MUXes-MUX A 550*a* and MUX B 550*b*, and a Control Unit 560. The Device 520 unit responds for checksum calculation, random number generation, mutable bits calculation, length calculations, reference pointer calculations, temp information storage . . . and so on. The Control Unit 560 controls the programming sequence, which directs data transfers. There are three types of data transfers, from buffer to peripheral, from peripheral to buffer, and from buffer to buffer. Here the term peripheral means it could be an engine, an Output FIFO 530, or a Device 520. For from buffer to peripheral case, BUS A 570*a* is used for data transfers from Buffer A 540*a* to a peripheral. For from peripheral to buffer case, MUX A 550*a* selects one path to write data from a peripheral to Buffer A 540*a*. Finally for the from buffer to buffer case, data are read from Buffer A 540*a* and written to the same address via BUS A 570*a* and MUX A 550*a*.

The Control Unit 560 conducts IPSec processing as follows: A packet together with its associated SA(s) is inlet into Buffer A 540*a*. The Control Unit 560 then conducts packet forming (header making, trailer making, and form an IPSec packet) according to the acquired SA information. A formed packet is then delivered to the Encryption Engine 500 or Authentication Engine 510. For AH mode, one has to perform muting on the IP header and option field. For ESP mode, part of the formed packet is delivered to the Encryption Engine 500 and/or Authentication Engine 510. The encrypted results are stored back to their original place. Packet output are going on thereafter. If both encryption and authentication are in need for processing a packet, the Authentication Engine 510 accesses the ciphered data, which have been stored in buffer. The packet data is kept in the buffer for waiting when the packet data needs authentication (encryption) but the Authentication Engine 510 (or Encryption Engine 500) is not available. Note that the sequence controller chains the encryption and the authentication operation together by controlling the data transfer from buffer to the Encryption engine and to the Authentication engine.

The Module B works in the same way that the Module A does. These two modules cooperate with each other to gain a higher performance. The cooperation retains the pipeline spirit. However, it does not act like the traditional pipeline. It may be more appropriate to call the cooperation "sharing".

For the inbound service, one has to verify the packet to see if it is a fake one. Five parameters are used for verification, including protocol, source address, destination address, and port numbers. The formal three items are in the IP header and the last item is in the TCP/IP header. One got to decrypt the received packet, reducing to its original values, from which we can access those the five parameters for verification. For the traditional pipeline, one has to do the verification in the Post_Operation. In other words, one has wait until the whole decryption is done. Accordingly, the triple DES operation is the bottleneck of the whole process and packets may be as long as fifteen hundred bytes. This wastes a lot of time to operate on illegal packets. In our design, we can perform such a verification right after the decryption of the TCP/UDP header.

Figure 6:
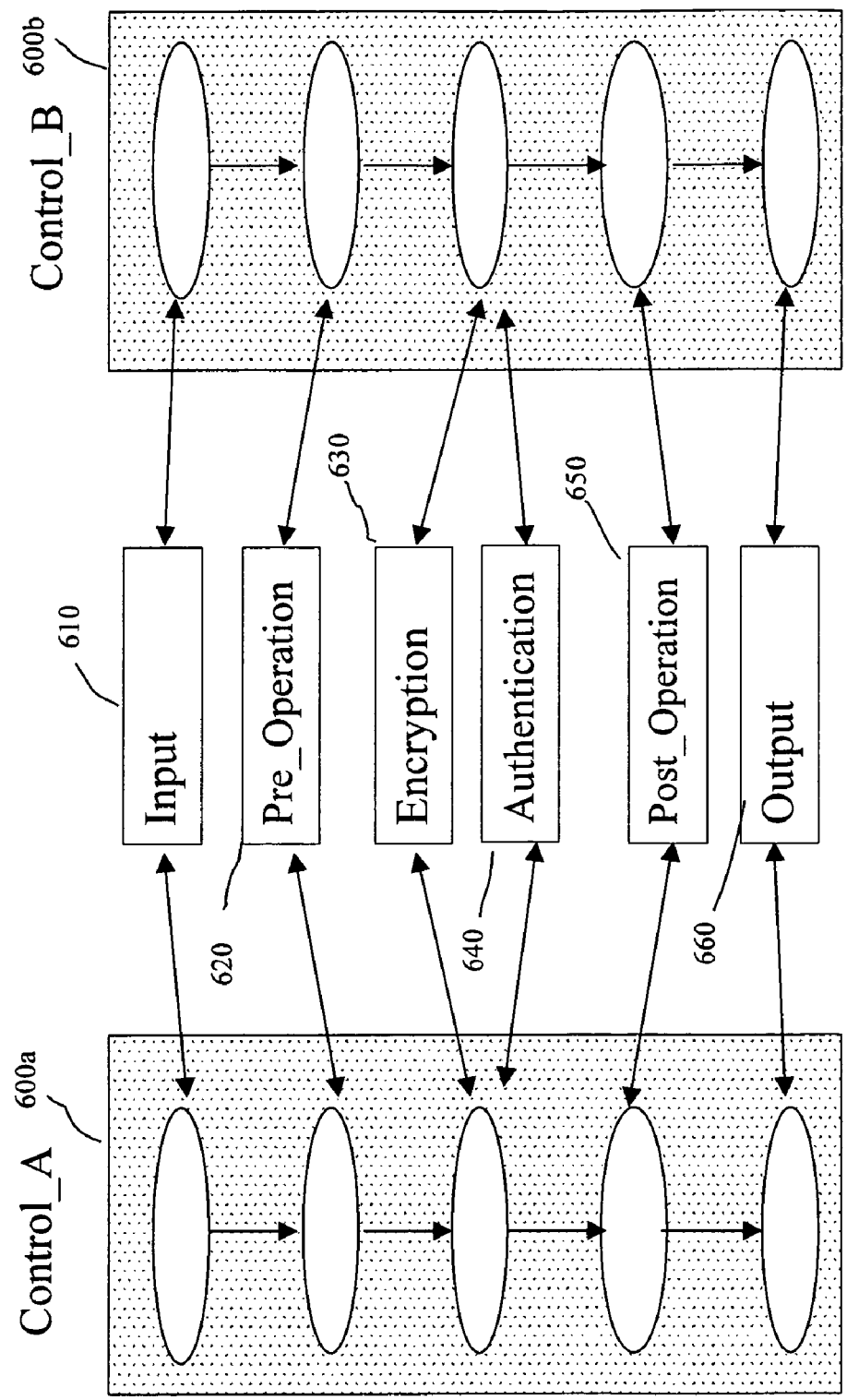
FIG. 6 is a function block of the Control Unit according to the preferred embodiment of the present invention shown in FIG. 5.

FIG. 6 shows the Control Unit 560 in FIG. 5. The Control Unit 560 is composed of eight sub-units. The spotted blocks are finite state machines, which control the processing order while the rectangular ones are individual control functions. Each control function uses a finite state machine to drive a DMA (Direct Memory Access) for data transferring. We call the spotted blocks sequence controllers. Each oval-shaped ones stands for a specific state, which will call one or two functions as indicated. There are five states, the Input State 610, Pre_Operation State 620, Operation State (Encryption 630 or Authentication 640), Post_Operation State 650, and Output State 660 for a sequence controller. Two Sequence controllers, the Control_A 600*a* and Control_B 600*b* share the rectangular-shaped functions with each other. We call it a sharing structure. The processing flow is described as below:

A packet is allowed to enter the IPSec Core only when one of the sequence controllers is in the Input State such that it can call the Input function. Packet data are guided to sit on the buffer.

Two packets data at most are allowed to stay in the IPSec Core at a time. Packet data stored on buffer go through the Pre_Operation, Operation and Post_Operation, and output in sequence. Any of these processes could serve the packet data following the "first come, first serve" principle. Two sequence controllers are similar to each other, except that one of them has an additional "Yield State", such that two sequence controllers will not both go to the Input State at the power up moment.

If a packet demands an additional SA service for the bundle SA case, the packet has to experience additional Pre_Operation, Operation and Post_Operation. That packet can't be outputted until finishing all the processes associated with the last SA.

As soon as one sequence controller is using a function, the other one is not allowed to use that function. This structure allows one sequence controller calls Encryption 630 and the other calls Authentication 640 at the same time.

While the invention has been described by way of example and in terms of the preferred embodiment, it is to be understood that the invention is not limited to the disclosed embodiments. To the contrary, it is intended to cover various modifications and similar arrangements as would be apparent to those skilled in the art. Therefore, the scope of the appended claims should be accorded the broadest interpretation so as to encompass all such modifications and similar arrangements.

What is claimed is:

1. An IPSec Core for executing IPSec processing, which comprises:
   an Encryption Engine for encrypting part of formed packet data for outbound service or decrypting part of decapsulated packet data for the inbound service;
   an Authentication Engine for authenticating the packet data or the processed packet data;
   a Device unit for providing miscellaneous calculations to process the packet data or the processed packet data;
   two modules, each of the module comprising:
      a buffer for storing the packet data or the processed packet data;
      a BUS for transferring the packet data or the processed packet data in the IPSec Core;
      a multiplexer for selecting path for the packet data or the processed data to be transferred into the buffer from the Encryption Engine, the Authentication Engine, the Device unit, the buffer or the external source;
      an Output FIFO for outputting the processed packet data; and
      a Control Unit for controlling the IPSec processes, wherein the Control Unit further comprises:
   two sequence controllers for controlling at least one processing sequence of the packet data or the processed packet data;
   an Input controller for controlling the packet data, the processed packet data or the SA data being inputted to the IPSec Core;
   a Pre_Operation controller for forming an IPSec Packet, part of that packet is used for crypto operation including the encryption, the authentication, or both the encryption and the authentication;
   an Encryption controller for controlling the packet data or the processed packet data transferring to/from the Encryption Engine;
   an Authentication controller for controlling the packet data or the processed packet data transferring to/from the Authentication Engine;
   a Post_Operation controller for dealing with the processed packet data after the crypto operation; and
   an Output controller for outputting the processed packet data.

2. The IPSec Core of claim 1, wherein the packet data is from the IN Buffer of the IPSec processor and the processed data means that the data have been processed by the Encryption Engine, the Authentication Engine or the Device unit.

3. The IPSec Core of claim 1, wherein the Encryption Engine and the Authentication Engine are independent of each other so that one can perform an encryption for a first packet data and an authentication for a second packet data at the same time within the IPSec processes.

4. The IPSec Core of claim 1, wherein the Device unit provides required information for a crypto operation so that no additional context is needed.

5. The IPSec Core of claim 1, wherein the buffers in the modules acts as an input data buffer, as a working buffer, and as an output buffer; the total buffer size is the same as if the buffers are moved to the External IN Buffer or the External OUT Buffer.

6. The IPSec Core of claim 1, wherein the BUSes could be merged into one for the two modules with a BUS data controller.

7. The IPSec Core of claim 1, wherein the two sequence controllers share the Input controller, the Pre_Operation controller, the Post_Operation controller, the Encryption controller, the Authentication controller, and the Output controller with each other, the two sequence controllers can not both call the same function at the same time.

8. The IPSec Core of claim 1, wherein the two sequence controllers run their own sequence, therefore, two different packet data can be processed at the same time; in addition, it allows that one of the sequence controllers calls encryption for a first packet and the other sequence controller calls authentication for a second packet.

9. The IPSec Core of claim 1, wherein the sequence controllers allow the processing of the bundled SA case, the processing sequence continues the processes for the bundled SA without moving the processed results of the previous SA and the whole processing is done when all the bundled SAs have been processed.

10. The IPSec Core of claim 1, wherein the sequence controllers allow an early verification of the packet data or the processed packet data, and do not need to perform the verification after the finish of the decryption operation.

11. The IPSec Core of claim 1, wherein the sequence controllers can call both the encryption and the authentication operations simultaneously and respectively for the different packet data.

12. The IPSec Core of claim 1, wherein the encryption controller and the authentication controller are designed to be able chained together by controlling the data transferred from buffer to the encryption engine and to the authentication engine; the transfer from buffer to the authentication engine steals the transfer cycle from buffer to the authentication engine.

* * * * *